US007244966B2

(12) United States Patent
Fukayama

(10) Patent No.: US 7,244,966 B2
(45) Date of Patent: Jul. 17, 2007

(54) LIQUID CRYSTAL DISPLAY DEVICE

(75) Inventor: Norihisa Fukayama, Mobara (JP)

(73) Assignee: Hitachi, Ltd., Tokyo (JP)

( * ) Notice: Subject to any disclaimer, the term of this patent is extended or adjusted under 35 U.S.C. 154(b) by 144 days.

(21) Appl. No.: 10/983,756

(22) Filed: Nov. 9, 2004

(65) Prior Publication Data

US 2005/0062902 A1 Mar. 24, 2005

Related U.S. Application Data

(63) Continuation of application No. 10/020,976, filed on Dec. 19, 2001, now Pat. No. 6,835,961.

(30) Foreign Application Priority Data

Dec. 25, 2000 (JP) ............................. 2000-392009

(51) Int. Cl.
*H01L 33/00* (2006.01)
(52) U.S. Cl. ..................... 257/98; 257/E33.071; 349/60
(58) Field of Classification Search .................. 349/60, 349/123, 160; 257/E33.056, E33.071
See application file for complete search history.

(56) References Cited

U.S. PATENT DOCUMENTS

| 4,597,636 | A | * | 7/1986 | Hoshikawa | .................. 349/158 |
| 5,838,412 | A | | 11/1998 | Ueda et al. | |
| 6,020,867 | A | * | 2/2000 | Shimada et al. | .............. 345/87 |
| 6,064,455 | A | * | 5/2000 | Kim | ............................ 349/113 |
| 6,068,381 | A | | 5/2000 | Ayres | |
| 6,091,474 | A | | 7/2000 | Middleton et al. | |
| 6,175,396 | B1 | | 1/2001 | Kim et al. | |
| 6,191,833 | B1 | | 2/2001 | Hirakata | |
| 6,411,353 | B1 | | 6/2002 | Yarita et al. | |

FOREIGN PATENT DOCUMENTS

| JP | 01-225917 | 9/1989 |
| JP | 1-225917 | 9/1989 |
| JP | 06-301034 | 10/1994 |
| JP | 6-301034 | 10/1994 |
| JP | 9-090361 | 4/1997 |
| JP | 09-090361 | 4/1997 |
| JP | 11-281966 | 10/1999 |
| JP | 2000-0020693 | 4/2000 |
| JP | 2000-258756 | 9/2000 |
| KR | 10-2000-0020693 | 4/2000 |

* cited by examiner

*Primary Examiner*—Carl Whitehead, Jr.
*Assistant Examiner*—Jennifer M Dolan
(74) *Attorney, Agent, or Firm*—Antonelli, Terry, Stout & Kraus, LLP.

(57) ABSTRACT

In a liquid crystal display device, a recessed portion is formed in a portion of a periphery of a lower frame, a columnar member is provided to the recessed portion, the columnar member is allowed to pass through a hole formed in a projecting portion which is provided on an optical sheet, and a side surface of a liquid crystal panel is brought into contact with the columnar member. The columnar member provided on the lower frame not only determines the position of the liquid crystal panel with respect to the lower frame, but also determines the position of the optical sheet with respect to the lower frame and firmly holds the optical sheet onto the lower frame, thus preventing the disengagement of the optical sheet from the lower frame.

10 Claims, 12 Drawing Sheets

LIQUID CRYSTAL DISPLAY DEVICE

CROSS-REFERENCE TO RELATED APPLICATIONS

This application is a continuation of application Ser. No. 10/020,976 filed on Dec. 19, 2001 now U.S. Pat. No. 6,835,961. The contents of application Ser. No. 10/020,976 are hereby incorporated herein by reference in their entirety.

BACKGROUND OF THE INVENTION

The present invention relates to a liquid crystal display device; and, more particularly, the invention relates to a liquid crystal display device in which the reliability is enhanced by holding an optical sheet that is interposed between a liquid crystal panel and a backlight, which is arranged at a back surface of the liquid crystal panel, at a given position in such a way as to prevent a positional displacement of the optical sheet.

A liquid crystal display device, which is capable of generating a color display of high definition for a notebook type computer or a computer monitor, is provided with a light source for illuminating the liquid crystal panel from a back of the panel (a so-called backlight), and an optical sheet is interposed between the backlight and the liquid crystal panel for correcting the light provided from the backlight so that it has a given brightness distribution with respect to the liquid crystal panel.

The liquid crystal panel which constitutes this type of liquid crystal display device basically sandwiches a liquid crystal layer between two substrates, at least one of which is a transparent substrate, such as a glass plate or the like. This type of liquid crystal panel is roughly classified into a type which turns on and off given pixels by selectively applying voltages to various kinds of electrodes for forming pixels, which are formed on the substrate (simple matrix), and a type which forms the above-mentioned various kinds of electrodes along with active elements for selecting pixels and turns on and off given pixels by selecting the active elements (active matrix). Currently, due to the fact that the active matrix type liquid crystal panel has advantageous characteristics, such as high definition and high-speed display, the active matrix liquid crystal panel has been popularly accepted.

The conventional active matrix type liquid crystal display device employs a so-called vertical electric field type system in which an electric field is applied between pixel electrodes which are formed on one substrate and a common electrode which is formed on the other substrate so as to change the orientation direction of the liquid crystal layer (see Japanese Laid-open Patent Publication 309921/1988).

On the other hand, a so-called liquid crystal display device of the lateral electric field type (also referred to as "IPS type") has been developed, in which the direction of the electric field applied to the liquid crystal layer is substantially parallel to the surface of the substrate. As an example of a liquid crystal display device of this lateral electric field type, a display device has been proposed which can obtain an extremely wide viewing angle by using comb-shaped electrodes at one of the two substrates (see Japanese Laid-open Patent Publication 21907/1988, U.S. Pat. No. 4,345,249).

In any one of the above-mentioned liquid crystal display devices, as an illumination light source of the liquid crystal panel, there is a side edge backlight, which is constituted of a light guide plate and a linear lamp, and a direct backlight, in which a plurality of linear light sources are directly installed at a back surface of the liquid crystal panel.

Particularly, the side edge backlight is constructed as follows. A linear lamp (cold cathode fluorescent lamp, for example) is arranged along at least one side edge of a light guide plate, which is constituted of a transparent plate, such as an acrylic plate. Light irradiated from the linear lamp is introduced into the light guide plate, and the path of the light is changed in the course of propagation inside of the light guide plate and is irradiated from the light guide plate. Then, the light is corrected to a given brightness distribution by means of an optical sheet, which has a laminated structure formed of a light diffusion sheet and a prism, and then the light illuminates the liquid crystal panel disposed above the optical sheet.

The liquid crystal display device is assembled into a so-called liquid crystal display module by integrating the liquid crystal panel and the backlight together with the optical sheet using an upper frame and a mold case (also referred to as a "lower frame"). Usually, the light guide plate which constitutes the backlight is fitted into the mold case which constitutes the lower frame, and, thereafter, the optical sheet is positioned on the mold case. Then, the liquid crystal panel is mounted on and is positioned on the optical sheet.

However, the optical diffusion sheet and the prism sheet, which constitute the optical sheet, are extremely thin film-like members. These film-like members must be positioned at a given position on the lower frame. Further, it is necessary to prevent a positional displacement and disengagement of the film-like members in the course of conveying the assembly during the manufacturing process or in the course of transporting it to an assembly plant for further assembly.

FIG. 17A and FIG. 17B are schematic diagrams illustrating an example of a conventional a structure for positioning and holding an optical sheet in a liquid crystal display device, wherein FIG. 17A is a cross-sectional view of a relevant part and FIG. 17B is a developed perspective view of the relevant part.

In FIG. 17A and FIG. 17B, MCA indicates a lower frame in the form of a resin mold which is configured to house a reflection sheet RFS, a light guide plate GLB, an optical sheet OPS, a liquid crystal panel PNL and the like. The reflection sheet RFS is mounted on the lower frame MCA, and the light guide plate GLB is fitted onto the reflection sheet RFS from above. The optical sheet OPS is positioned on the light guide plate GLB.

In this example, as shown in FIG. 17B, the optical sheet OPS is constituted of four film members in total, wherein optical diffusion sheets SPS are laminated to both sides of two prism sheets PRS whose groove directions cross each other. A projecting portion (lug) TAB is formed on one of the peripheries of the optical sheet OPS, and the optical sheet OPS is positioned by passing a columnar member (pin) PIN, which is mounted on the lower frame MCA, through a hole HOL formed in the projecting portion TAB. Thereafter, a cylindrical sleeve SB made of silicone or rubber is fitted on the columnar member PIN from above the columnar member PIN so as to fix the optical sheet, thus preventing removal or disengagement of the optical sheet OPS from the columnar member PIN.

Then, the liquid crystal panel PNL is assembled into the lower frame MCA and is then covered with an upper frame SHD. Subsequently, the upper frame SHD is fixed to the lower frame MCA so as to form an integrated liquid crystal display module.

The mounting position of the columnar member PIN is usually disposed at one of the peripheries of the lower frame MCA so as to avoid a side of the liquid crystal panel PNL on which a driver is mounted and a portion thereof where a liquid crystal filling and sealing opening is formed. A similar structure or a structure which simply holds the optical sheet loosely is provided at other peripheries of the lower frame MCA.

FIG. 18A and FIG. 18B are schematic views illustrating another conventional example of the positioning of an optical sheet in a liquid crystal display device and a holding structure thereof, wherein FIG. 18A is a cross-sectional view of a relevant part and FIG. 18B is a plan view of the relevant part. The same numerals as those used in FIG. 17A and FIG. 17B indicate identical functional elements.

In this example, U-shaped walls WL which surround projecting portions TAB formed on an optical sheet OPS from three directions are formed at four peripheries of a lower frame, and the projecting portions TAB formed on the optical sheet OPS are fitted into and seated in recessed portions formed by these U-shaped walls WL so as to provide for the positioning of the optical sheet OPS.

Further, there may be a method in which such U-shaped walls WL are formed only at two opposing peripheries or neighboring peripheries, or in which the U-shaped wall WL is formed at only one periphery and the optical sheet OPS and the lower frame are fixed to each other using an adhesive tape or the like at peripheries which are not provided with the U-shaped walls WL.

FIG. 19 is a developed perspective view illustrating a further conventional example of the positioning of an optical sheet in a liquid crystal display device and a holding structure thereof. In this conventional example, recessed portions DH are formed in front and back surfaces of a lower frame MCA. Columnar members PIN, similar to the columnar members PIN of the example described in conjunction with FIG. 17A and FIG. 17B, are formed such that they project at both front and back sides of the recessed portions DH. A projecting portion TAB, which is formed on the optical sheet OPS, is seated in the front-side recessed portion DH such that the columnar member PIN passes through a hole HOL formed in the projecting portion TAB. Thereafter, a clip CLM is fitted on the columnar members PIN which are projected at both front and back sides of the recessed portions DH.

This clip CLM is provided with an opening PR1 into which the front-side columnar member PIN is fitted from the lateral direction and an opening PR2 into which the back-side columnar member PIN is filled from the lower direction. The clip is formed of a metallic resilient material and resiliently fixes the optical sheet OPS to the lower frame MCA.

Examples of the above-mentioned structures are disclosed, for example, in Japanese Laid-open Patent Publication 281966/1999, Japanese Laid-open Patent publication 90361/1997 and Japanese Laid-open Patent Publication 258756/2000.

SUMMARY OF THE INVENTION

The structure for positioning the optical sheet relative to the lower frame in the above-mentioned conventional liquid crystal display devices has the following drawbacks to be solved.

With respect to the conventional structure which has been explained in conjunction with FIG. 17A and FIG. 17B, the columnar member PIN is required to have a sufficient height to allow the sleeve SB to fit on the columnar member PIN, so that the projecting length thereof from the lower frame MCA must be substantial. When this projecting length is increased, the size of the lower frame in the member thickness direction is increased, so that special care is required in the packaging of parts, or else chipping may occur at the time of transporting or handling the lower frame MCA before advancing to the assembling step. Further, in this constitution, the positioning of the liquid crystal panel PNL is not related to the positioning of the optical sheet OPS.

With respect to the conventional example which has been explained in conjunction with FIG. 18A and FIG. 18B, the optical sheet OPS has the projecting portions TAB thereof simply fitted into the space formed by U-shaped walls WL from above. Accordingly, at the time of conveying the assembly during the manufacturing process, or at the time of transporting the assembly to another manufacturing section, the above-mentioned projecting portions TAB may disengage from the U-shaped walls WL, or a positional displacement of the optical sheet OPS may occur. Further, also in this constitution, the positioning of the liquid crystal panel PNL is not related to the positioning of the optical sheet OPS.

In the conventional structure shown in FIG. 19, since the metallic clip CLM is used for securing the optical sheet OPS, the possibility that the metallic clip CLM may come into pressure contact with a liquid crystal panel that is laminated above the optical sheet OPS and subject the liquid crystal panel to damage can not be ignored. Further, the use of such a metallic clip CLM becomes one of the obstacles which hampers the reduction of cost in the manufacture of the liquid crystal display.

Further, none of the above-mentioned structures suggests the positioning of the liquid crystal panel, which is mounted on the optical sheet, after mounting the optical sheet on the lower frame.

Accordingly, it is an object of the present invention to solve the various problems mentioned above related arts and to provide a liquid crystal display device which can provide reliable positioning and secure holding of the optical sheet relative to the lower frame by use of a positioning guide on the liquid crystal panel and positioning means on the optical sheet in common, whereby the liquid crystal display device can have a structure which is capable of suppressing the removal or disengagement of the optical sheet assembled on the lower frame at the time of transporting the assembly or at the time of transferring it, so as to reduce man-hours for assembling and simplify the operation and reduce the manufacturing cost.

To achieve the above-mentioned object, in accordance with the present invention, a recessed portion (an indentation formed in a side wall which constitutes a frame, for example) is formed in a frame member (a lower frame, a mold case, for example) which holds and secures a light guide plate, an optical sheet and a liquid crystal panel; a columnar member is mounted or formed on the recessed portion; and the optical sheet is provided with a projecting portion in which a through hole is formed so as to allow the columnar member to pass through the through hole, whereby the optical sheet is positioned and held in the frame member, wherein the columnar member also functions as a guide for determining the position of the liquid crystal display panel with respect to the frame member. Typical constitutions of the present invention are described as follows.

Constitution (1):

The liquid crystal display device includes a liquid crystal panel (also referred to as "a liquid crystal display panel" or "a liquid crystal display element"), a backlight which is mounted on a back surface of the liquid crystal panel through an optical sheet, a rectangular lower frame (a mold case) which houses the backlight therein, and an upper frame (a metal case) which forms a picture frame for exposing an effective display area of the liquid crystal panel, has side walls extending toward the lower-frame side and is fixed to the upper frame.

The liquid crystal display device further includes a columnar member at a portion of a periphery of the lower frame which is served for restricting and holding the optical sheet at a given position, as well as for positioning the liquid crystal panel at a given position, and the optical sheet includes a through hole which allows the columnar member to pass therethrough at a side portion thereof, which corresponds to the periphery on which the columnar member is mounted.

The back surface of the liquid crystal panel is one of a pair of main surfaces of the liquid crystal panel which is positioned at a back of the liquid crystal panel (the liquid crystal display device on which the liquid crystal panel is mounted in a strict sense) as viewed by a user. Irrespective of the shape, any backlight, including a side edge backlight in which a light guide plate is arranged at a back surface of the liquid crystal panel in an opposed manner and a direct backlight in which a plurality of light sources are arranged at a back surface of the liquid crystal panel in an opposed manner, can be used. The effective display area is an area which is used for reproduction of desired images within the main surface of the liquid crystal panel. A through hole is a so-called opening, and a through hole can be formed into any suitable shape.

Constitution (2):

The optical sheet shown in the constitution (1) includes at least one light diffusion sheet or at least one prism sheet and is constituted by laminating at least one light diffusion sheet and at least one prism sheet when necessary.

The liquid crystal display device which performs active matrix driving in an In-Plane Switching (hereinafter abbreviated as "IPS") system uses a so-called direct backlight in which a plurality of tubular light sources are arranged such that these light sources face the main surface of the liquid crystal panel in an opposed manner, and, hence, it is preferable to use a diffusion plate as at least one light diffusion sheet.

Further, the liquid crystal display device mounted on a notebook type computer adopts a so-called side edge backlight in which a light guide plate formed of acrylic resin or the like faces a main surface of a liquid crystal panel in an opposed manner and in which at least one tubular light source is arranged at a side surface thereof (the tubular light source being prevented from facing at least an effective display area of the main surface of the liquid crystal panel). However, it may be possible to use a prism sheet which has a prism surface at the light guide plate side as at least the above-mentioned one prism sheet. Further, it is preferable to use a light guide plate which has a light scattering surface at a prism sheet side thereof.

In any case, a projecting portion is formed at a side portion of the optical sheet which corresponds to a periphery of the lower frame on which the columnar member is mounted and a through hole which allows the columnar member to pass therethrough is formed in the projecting portion of the optical sheet.

Constitution (3):

In the constitution (2), a recessed portion which accommodates the projecting portion of the optical sheet is formed in the periphery of the lower frame where the columnar member is mounted, and the columnar member is allowed to pass through the through hole formed in the projecting portion of the optical sheet so that the optical sheet is fixed to the lower frame.

Constitution (4):

In the constitution (1), the columnar member which is mounted on the lower frame is allowed to pass through the through hole formed in the optical sheet, and, with the use of an adhesive tape, the optical sheet is fixed to the periphery of the lower frame where the columnar member is mounted.

Constitution (5):

In the liquid crystal display device defined by the constitutions (1) to (4), another optical sheet holding structure, in which the optical sheet is held loosely in comparison with the aforementioned structure which holds the optical sheet by use of the columnar member and the through hole, is newly provided to one of peripheries of the lower frame, other than the periphery thereof having the columnar member (also called as "a first side of the lower frame"). The other periphery of the lower frame is one of the peripheries thereof that is arranged adjacent to the aforementioned periphery thereof having the columnar member (a second side being transverse to the first side), or it is arranged opposite to the aforementioned periphery thereof having the columnar member (a third side being opposite to the first side).

Constitution (6):

The optical sheet holding structure in the constitutions (1) to (5) is constituted by a columnar projection, which is formed on one of the above-mentioned neighboring peripheries or the above-mentioned opposite periphery of the lower frame, and an opening which is formed on other periphery of the optical sheet and allows the columnar projection to loosely pass therethrough.

Constitution (7):

The optical sheet holding structure in the constitutions (1) to (5) is constituted of a recessed portion, which is formed in one of the above-mentioned neighboring peripheries or the above-mentioned opposite periphery of the lower frame, and a projecting portion which is formed on a portion of the optical sheet corresponding to the recessed portion and is seated in the recessed portion.

Constitution (8):

The optical sheet holding structure in the constitution (7) is provided with a disengagement restriction member which restricts the disengagement of the projecting portion of the optical sheet from the recessed portion.

Constitution (9):

The columnar member in the constitution (1) or (2) is integrally formed with the lower frame (mold case).

Constitution (10):

The columnar member in the constitution (1) or (2) is formed separately from the mold case and is fitted into the lower frame (mold case) through a hole formed in the lower frame (mold case).

Constitution (11):

The portion of the columnar member in the constitution (9) or (10) for positioning the liquid crystal panel is shaped so that the size thereof in the direction opposite to the liquid crystal panel is different from the size of a portion for holding the optical sheet being formed integrally with or separately from the columnar member.

Due to the above-mentioned respective constitutions, the positioning and the holding of the optical sheet onto the lower frame (mold case) can be reliably performed, and, at the same time, this function can be also serve as a guide for positioning the liquid crystal panel, which is mounted on the optical sheet in a superposed manner, so that the removal or the disengagement of the optical sheet at the time of conveying or transporting the lower frame into which the optical sheet is incorporated can be suppressed. Further, since the man-hours for assembling can be reduced, the operation is simplified and the manufacturing cost can be reduced.

On the other hand, in the liquid crystal display device described hereinafter, the present invention is embodied in any one of the following constitutions (12) to (24).

The liquid crystal display device described here includes a liquid crystal panel, a backlight which is arranged to face a first main surface of the liquid crystal panel (a back surface of the liquid crystal panel as viewed by a user of the liquid crystal display device) in an opposed manner, an optical sheet (see, the above-mentioned constitution (2) with respect to the constitutional content) which is arranged between the first main surface of the liquid crystal panel and the backlight, a first frame (lower frame in the above-mentioned constitution (1)) having a rectangular shape which accommodates the backlight, and a second frame (an upper frame in the above-mentioned constitution (1)) which is formed in the shape of a picture frame and covers at least a portion of a periphery of a second main surface (a user-side surface of the liquid crystal display device, a so-called front surface of the liquid crystal panel) which faces the first main surface of the liquid crystal panel in an opposed manner and a side surface formed on the first frame.

In the liquid crystal panel, a liquid crystal layer is sandwiched by a pair of substrates (transparent substrates having insulation) and electrodes and wiring patterns which apply an electric field to the liquid crystal layer are formed on a liquid-crystal-layer side main surface of at least one of these substrates.

The backlight includes not only a substantial light source, such as a cold cathode fluorescent lamp or a light emitting element, but also a backlight system, a backlight unit or an illumination device, which is provided with optical elements which are disposed between the light source and the liquid crystal element.

With respect to the direct backlight which arranges a plurality of tubular light sources such that the tubular light sources face the first main surface of the liquid crystal panel in an opposed manner, a reflection plate, which is arranged at a side opposite to the optical sheet (arranged between the tubular light sources and the first main surface of the liquid crystal panel) with respect to the tubular light source, may be included in the backlight. On the other hand, with respect to a side edge backlight, in which a light guide plate (an optical element made of acrylic resin or the like) is arranged such that a main surface of the light guide plate faces the first main surface of the liquid crystal panel, at least one tubular light source is arranged to face a side surface of the light guide plate, and a reflection sheet is arranged on the other main surface of the light guide plate, wherein the light guide plate and the reflection sheet may be included in the backlight.

A so-called mold case, which is formed by molding synthetic resin, for example, is used as the first frame. In the liquid crystal display device of this example, on one of the main surfaces (including openings formed therein) of the first frame (referred to as "a bottom surface of the first frame" hereinafter), the backlight, the optical sheet and the liquid crystal panel are laminated in this order, and the periphery of the second main surface of the liquid crystal panel is suppressed by a so-called picture frame of the second frame, thus assembling the liquid crystal display device.

As the second frame, a shield case which is produced by forming a window (exposing the effective display area of the liquid crystal panel) in a bottom surface of a metal frame, which is formed in the shape of a frame using a metal plate, or a metal case which is formed in a box shape, can be used, for example.

To apply the present invention to the liquid crystal display device of the example described above, such a liquid crystal display device exhibits the following constitutional features.

Constitution (12):

When the periphery of the bottom surface of the first frame is constituted by including a first pair of sides which face each other in an opposed manner and a second pair of sides which extend in the direction intersecting the first pair of sides and which face each other in an opposed manner, at least one first columnar member is mounted on one (first periphery) of a first pair of sides of the main surface of the first frame which faces the second frame, at least one second columnar member is mounted on one (second periphery) of a second pair of sides of the main surface of the first frame which faces the second frame in an opposed manner, a first opening into which the first columnar member is fitted is formed in a periphery (first periphery) of the optical sheet which faces one of a first pair of sides of the first frame, and a second opening into which the second columnar member is fitted is formed in a periphery (second periphery) of the optical sheet which faces one of a second pair of sides.

Assuming that the first frame has a rectangular bottom surface, the bottom surface of the first frame and the first periphery and the second periphery of the optical sheet are extended in an L-shape from one corner of the bottom surface. That is, the positional displacement of the optical sheet with respect to the first frame is prevented by two sides of the first frame which are extended in the L-shape.

On the other hand, the positioning of the liquid crystal panel in the first frame becomes necessary in a so-called assembling step of the liquid crystal display device in which the liquid crystal panel is mounted on the optical sheet. Here, when the liquid crystal display device is completed, the liquid crystal panel is constrained by the first frame and the second frame, which covers at least a portion of the side surface of the first frame, and, hence, the necessity of such a positioning of the liquid crystal panel becomes decreased. Accordingly, in the step which places the liquid crystal panel on the optical sheet, it is sufficient to guide two sides of the liquid crystal panel by two sides of the first frame extending in the L-shape.

In this embodiment, the above-mentioned first columnar member is formed into a size which can face the side surface of the liquid crystal panel in an opposed manner, and a portion (portion A) which faces the side surface of the liquid crystal panel in an opposed manner is projected to the side surface side of liquid crystal panel more than the other portion (portion B) which is fitted into the first opening. For example, when the first columnar member is formed into a circular columnar shape, the radius of the portion A is made larger than the radius of the portion B. Due to such a constitution, the positioning of the liquid crystal panel in the assembling step of the liquid crystal display device can be performed promptly and reliably.

The shapes of the first columnar member and the second columnar member which have been referred to in the above-mentioned constitution (12) and which will be referred to in the constitutions (13) to (24), respectively, are not limited to a circular columnar shape. For example, the first columnar member and the second columnar member may be formed to have a rectangular parallelepiped shape or a hook shape, or they may be formed to have a wall shape extending along the first periphery or the second periphery.

Constitution (13):

In the above-mentioned constitution (12), "a bank" having a surface which faces a side surface of the backlight is formed on one of a first pair of sides of the main surface of the first frame, which faces the second frame in an opposed manner (first periphery), and the first columnar member is formed on this bank.

Due to such a constitution, the position (height measured by using the bottom surface of the first frame as a reference) of the joining portion between the first columnar member and the first frame, and such a position of the optical sheet, can be aligned so that the stress and the distortion which is applied to the optical sheet at the time of fixing the optical sheet to the first frame at the first columnar member can be reduced.

Although the bank which is referred to here may be formed as a wall which surrounds the bottom surface of the first frame, the bank may be intermittently formed in conformity with openings formed in the bottom surface to enable heat radiation from the first frame or to make the first frame more light-weight.

Constitution (14):

In the above-mentioned constitution (13), the periphery of the portion of the bank where the first columnar member is formed is formed such that the periphery is indented toward the main surface of the first frame (the bottom surface of the above-mentioned first frame) which faces the second frame in an opposed manner.

Constitution (15):

In the above-mentioned constitution (12), the second opening of the optical sheet is formed in the projecting portion of the optical sheet which projects from the side thereof and which faces one of a second pair of sides of the first frame (the second periphery of the optical sheet) toward one of a second pair of sides (the second periphery of the first frame).

Constitution (16):

In the above-mentioned constitution (15), on one of a second pair of sides of the main surface of the first frame, which faces the second frame in an opposed manner (second periphery), a projecting portion is mounted which projecting portion is formed closer to the side surface of the liquid crystal panel than the second columnar member. This projecting portion is used for positioning the liquid crystal panel with respect to the first frame.

Constitution (17):

In the liquid crystal display device of this example, when the periphery of the first frame (the periphery of the bottom surface of the first frame) is constituted by including a first pair of sides which face each other in an opposed manner and a second pair of sides which extend in the direction intersecting a first pair of sides and face each other in an opposed manner, at least one first columnar member is mounted on one (first periphery) of a first pair of sides of the main surface of the first frame, which faces the second frame in an opposed manner, a projecting member which faces a side surface of the liquid crystal panel is mounted on one (second periphery) of a second pair of sides of the main surface of the first frame, which faces the second frame in an opposed manner, a fitting member, which is fitted into a periphery of the optical sheet, is mounted on the other (third periphery) of a pair of the above-mentioned first sides of the main surface of the first frame, which faces the second frame in an opposed manner.

Further, a first opening into which the first columnar member is fitted is formed in a periphery (first periphery) of the optical sheet which faces one of a first pair of sides of the first frame, and a fitting portion into which the fitting member is fitted is formed in a periphery (third periphery) of the optical sheet which faces the other of a first pair of sides.

Further, a portion of the first columnar member, which faces the side surface of the liquid crystal panel in an opposed manner, projects toward the side surface of the liquid crystal panel more than the other portion of the first columnar member which is fitted into the first opening.

Assuming that the first frame has a rectangular bottom surface, the second periphery has one end thereof joined with the first periphery and the other end thereof joined with the third periphery. Accordingly, the first periphery, the second periphery and the third periphery are arranged to have a shape similar to the Greek letter π. In the constitution (17), the liquid crystal panel is positioned with respect to the first frame using the first columnar member and the protruding member, which are arranged in an L shape, while the optical sheet is fixed to the first frame using the first columnar member and the fitting member, which are arranged at two opposing sides in the Greek letter π shape.

Constitution (18):

In the constitution (17), at least one of fitting members formed in the first frame is formed of the second columnar member, while the fitting portions formed in the optical sheet are formed with at least one of the second openings into which the second columnar members are fitted.

Constitution (19):

In the constitution (17), a bank having a surface which faces a side surface of the backlight is formed on the other (third periphery) of a pair of the first sides of the main surface of the first frame, which faces the second frame in an opposed manner, a recessed portion is formed by indenting the bank toward the main surface of the first frame, which faces the second frame in an opposed manner (bottom surface of the above-mentioned first frame), thus forming the fitting member, and a projecting portion which is projected toward the other of a pair of the first sides (third periphery of the first frame) is formed on a side of the optical sheet which faces the other of a pair of the first sides of the first frame (third periphery of the optical sheet), thus forming the fitting portion.

In the third periphery of the first frame, a projecting portion of the optical sheet (projecting along the extending direction of the second periphery) is fitted into a recessed portion formed in a bank of the first frame. Since the optical sheet is formed in a film shape or a planar plate shape having a main surface along the first main surface of the liquid crystal panel, the optical sheet can be extended or shrunk within the main surface in conformity with the environment in which the liquid crystal display device is used.

When the optical sheet is held by the first periphery and the third periphery of the first frame with similar holding forces, with expansion of the optical sheet along the extension direction of the second periphery, wrinkles may be generated at a portion of the main surface of the optical sheet which faces the liquid crystal panel, so that the characteristics of the optical system from the backlight to the liquid crystal panel may be damaged.

In the mode of the constitution (19), the holding of the optical sheet at the third periphery of the first frame is made loose compared to the holding of the optical sheet at the first periphery of the first frame. Accordingly, the expansion of the optical sheet along the extension direction of the second periphery of the first frame can be absorbed by the slight displacement of the projecting portion of the optical sheet at the recessed portion of the bank of the first frame.

Constitution (20):

In any one of the modes of the above-mentioned constitutions (12) to (15) and constitution (18), a portion of the second columnar member, which faces the side surface of the liquid crystal panel (portion A), is projected toward the side surface of the liquid crystal panel more than the other portion of the second columnar member, which is filled into the second opening (portion B). Due to such a portion A of the first columnar member and the second columnar member, the liquid crystal panel can be positioned with respect to the first frame.

Constitution (21):

In the liquid crystal display device of this example, when the periphery of the first frame (the periphery of the bottom surface of the above-mentioned first frame) is constituted so as to include a first pair of sides which face each other in an opposed manner and a second pair of sides which extend in the direction intersecting a first pair of sides and which face each other in an opposed manner, at least one first columnar member is mounted on one (first periphery) of a first pair of sides of the main surface of the first frame, which faces the second frame in an opposed manner, at least one second columnar member is mounted on one (second periphery) of a second pair of sides of the main surface of the first frame which faces the second frame in an opposed manner.

Further, a first opening into which the first columnar member is fitted is formed in the periphery (first periphery) of the optical sheet which faces one of a pair of the first sides of the first frame, while a second opening into which the second columnar member is fitted is formed in the periphery (second periphery) of the optical sheet which faces one of a pair of the second sides of the first frame.

Both of the first columnar member and the second columnar member are configured to have portions (portions A) which face the side surfaces of the liquid crystal panel in an opposed manner. In the mode of the constitution (21), as in the case of the mode of the constitution (12), the optical sheet is held by the first columnar member and the second columnar member, which are arranged in an L-shape in the first frame, while the positioning of the liquid crystal panel is performed by the first columnar member and second columnar member.

Constitution (22):

In the constitution (21), driving circuits of the liquid crystal panel are respectively mounted on peripheries thereof along the other of the first pair of sides (third peripheries) and the other of the second pair of sides (fourth peripheries) of the first frame, while the driving circuits of the liquid crystal panel are not mounted on peripheries thereof along one of the first pair of sides (first peripheries) and the other of the second pair of sides (second peripheries) of the first frame.

In the constitution (22), in the same manner as the constitution (12) and the constitution (20), when the liquid crystal panel is positioned with respect to the first frame using the portions A of the first columnar member and the second columnar member (portions which face the side surfaces of the liquid crystal panel in an opposed manner), the driving circuit parts which are arranged on the side surface of the liquid crystal display panel or flexible printed circuit boards, which supply signals or electric power to the drive circuit parts, are brought into contact with the columnar member. Accordingly, there may be a possibility that an error occurs in the positional alignment of the liquid crystal panel due to the thickness of these parts.

Accordingly, it is recommended to separate a side surface which is used for positional alignment of the liquid crystal panel and a side surface which is used for supplying signals or electric power (being mounted with a printed circuit board, a connector or the like).

When the first frame has a rectangular bottom surface, in the mode of the constitution (22), one end of the first periphery is joined to one end of the second periphery, the other end of the second periphery is joined to one end of the third periphery, the other end of the third periphery is joined to one end of the fourth periphery, and the other end of the fourth periphery is joined to the other end of the first periphery, whereby the rectangular profile of the bottom surface of the first frame is constituted in the order of the first periphery, the second periphery, the third periphery and the fourth periphery.

Constitution (23):

In any one of the above-mentioned constitutions (12) to (16), the above-mentioned constitution (18) and the above-mentioned constitutions (20) to (22), the second opening is formed into a shape extending along one of a second pair of sides of the first frame (second periphery) compared to the first opening. For example, while the first opening is formed into a circular shape, the second opening is formed into an elliptical shape which is elongated along the second periphery (extension direction).

In any one of the above-mentioned constitutions (12) to (16), the above-mentioned constitution (18) and the above-mentioned constitutions (20) to (22), the position at which the second opening is formed in the optical sheet of the liquid crystal display device, which becomes the basis of these constitutions, is arranged to be spaced from the position at which the first opening is formed along the extension direction of the second periphery by a given distance. Accordingly, when the optical sheet expands in the above-mentioned manner, the given distance is increased.

Based on such a prerequisite, if the first opening of the optical sheet is firmly held by the first columnar member and the second opening of the optical sheet is firmly held by the second columnar member to the same degree, the expanded optical sheet is deflected between the first opening and the second opening, so that the optical conditions between the backlight and the liquid crystal panel are changed.

To the contrary, according to one example of the present invention, by elongating the second opening along the second periphery, the conventional deflection of the optical sheet derived from a positional displacement between the second columnar member and the second opening into which the second columnar member is inserted, such as caused by expansion of the optical sheet, can be prevented. Accordingly, the optical problem caused by the deflection of the optical sheet can be eliminated.

Constitution (24):

In any one of the above-mentioned constitutions 12 to 23, the periphery of the first frame along a pair of the second sides (the second and fourth peripheries) are more elongated than the periphery of the first frame along a pair of the first sides (the first and third peripheries).

The present invention is not limited to the above-mentioned constitutions and the constitutions of embodiments which will be explained later, and various modifications can be made without departing from the technical concept of the present invention.

These and other objects, features and advantages of the present invention will become more apparent from the following description when taken in conjunction with the accompanying drawings.

BRIEF DESCRIPTION OF THE DRAWINGS

FIG. 17A and FIG. 17B are schematic views showing a conventional example of positioning of an optical sheet in a liquid crystal display device and a holding structure thereof in an enlarged form, wherein FIG. 17A is a cross-sectional view and FIG. 17B is a developed perspective view;

FIG. 18A and FIG. 18B are schematic views showing another conventional example of positioning of an optical sheet in a liquid crystal display device and a holding structure thereof in an enlarged form, wherein FIG. 18A is a cross-sectional view and FIG. 18B is a plan view.

DETAILED DESCRIPTION

Embodiments of a liquid crystal display device according to the present invention will be described in detail in conjunction with the drawings.

Figure 1:
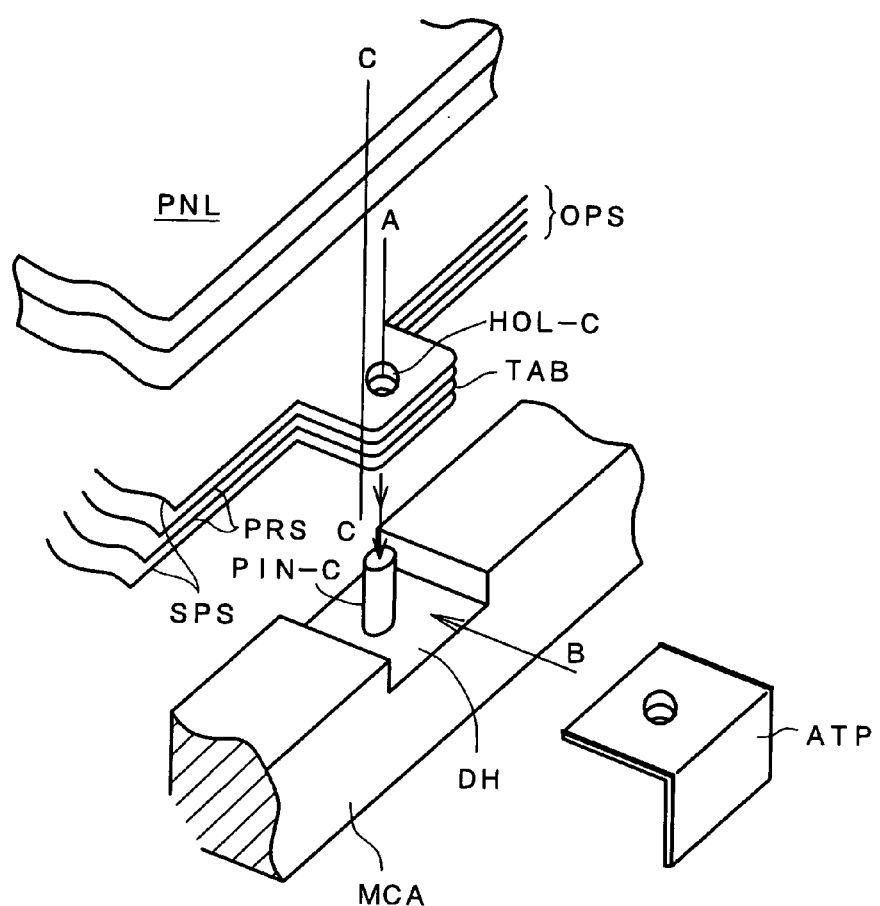
FIG. 1 is a developed perspective view of a part of a liquid crystal display device, schematically illustrating a structure for positioning and holding an optical sheet on a lower frame and a structure for positioning a liquid crystal panel in a first embodiment of a liquid crystal display device according to the present invention.

FIG. 1 is a developed perspective view of a part of a liquid crystal display device for schematically illustrating a structure for positioning and holding an optical sheet on a lower frame and a structure for positioning a liquid crystal panel in a first embodiment of a liquid crystal display device according to the present invention. Further, FIG. 2 is a cross-sectional view showing the arrangement after constitutional members are assembled in the first embodiment of the liquid crystal display device according to the present invention.

Figure 2:
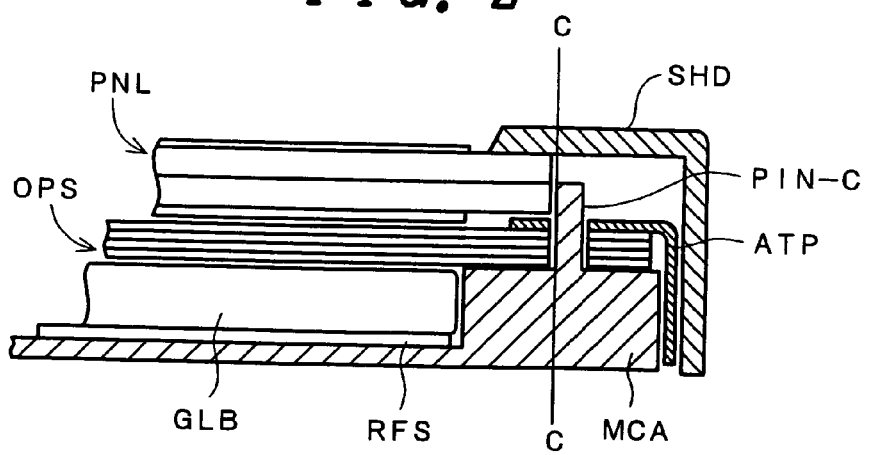
FIG. 2 is a cross-sectional view of a part of a liquid crystal display device after constitutional members are assembled to illustrate the first embodiment of the liquid crystal display device according to the present invention.

In FIG. 1 and FIG. 2, reference symbol MCA indicates a lower frame formed by resin molding (also referred to as a mold case, however, this element is referred to as a "lower frame" hereinafter). DH indicates a recessed portion (indentation) for positioning and holding an optical sheet OPS, and PIN-C indicates a columnar member for performing the positioning by passing through a through hole HOL-C formed in a projecting portion (also referred to as a flap or a tab) TAB which is formed as part of the optical sheet OPS. This columnar member PIN-C also functions as a guide for positioning the liquid crystal panel PNL.

The shape of the projecting portion TAB is not limited to a rectangular shape as shown in the drawing and may be a shape having both projecting side peripheries arranged in a non-parallel form or in a semicircular form or in another form. It is preferable to make the shape of the recessed portion formed in the lower frame MCA correspond to the shape of the projecting portion TAB.

The optical sheet OPS of this embodiment is formed of four sheets in total, consisting of two prism sheets PRS and two light diffusion sheets SPS, which are laminated to upper and lower surfaces (front and back surfaces) of these prism sheets PRS. However, the optical sheet OPS is not limited to such a constitution. That is, a combination of one prism sheet and one light diffusion sheet, a combination of two prism sheets and one light diffusion sheet, or a combination of one prism sheet and two light diffusion sheets or other various combinations can be adopted as the optical sheet OPS.

The liquid crystal display device is assembled as follows. First of all, a reflection sheet RFS is mounted on the lower frame MCA, and a light guide plate GLB, which constitutes a backlight, is fitted into the lower frame MCA such that the light guide plate GLB is positioned above the reflection sheet RFS. The light guide plate GLB is positioned so that it is seated in a frame portion for mounting the light guide plate, which is formed in the lower frame MCA.

Then, the columnar member PIN-C is passed through the through holes HOL-C which are formed in the respective projecting portions TAB of the respective sheets which constitute the optical sheet OPS from the direction indicated by arrow A in FIG. 1, and the projecting portion TAB is seated in the recessed portion DH and is fixed by one-sided adhesive tape ATP. By forming a hole through which the columnar member PIN-C passes in the one-sided adhesive tape ATP, the optical sheet OPS can be firmly fixed.

After positioning and fixing the optical sheet OPS, the liquid crystal panel PNL is positioned on the optical sheet OPS using a liquid-crystal-panel-side side wall of the columnar member PIN-C, indicated by a line C—C in FIG. 1 and FIG. 2, as a guide. The holding of THE other sides of the optical sheet OPS and the liquid crystal panel in position will be explained later.

Figure 3:
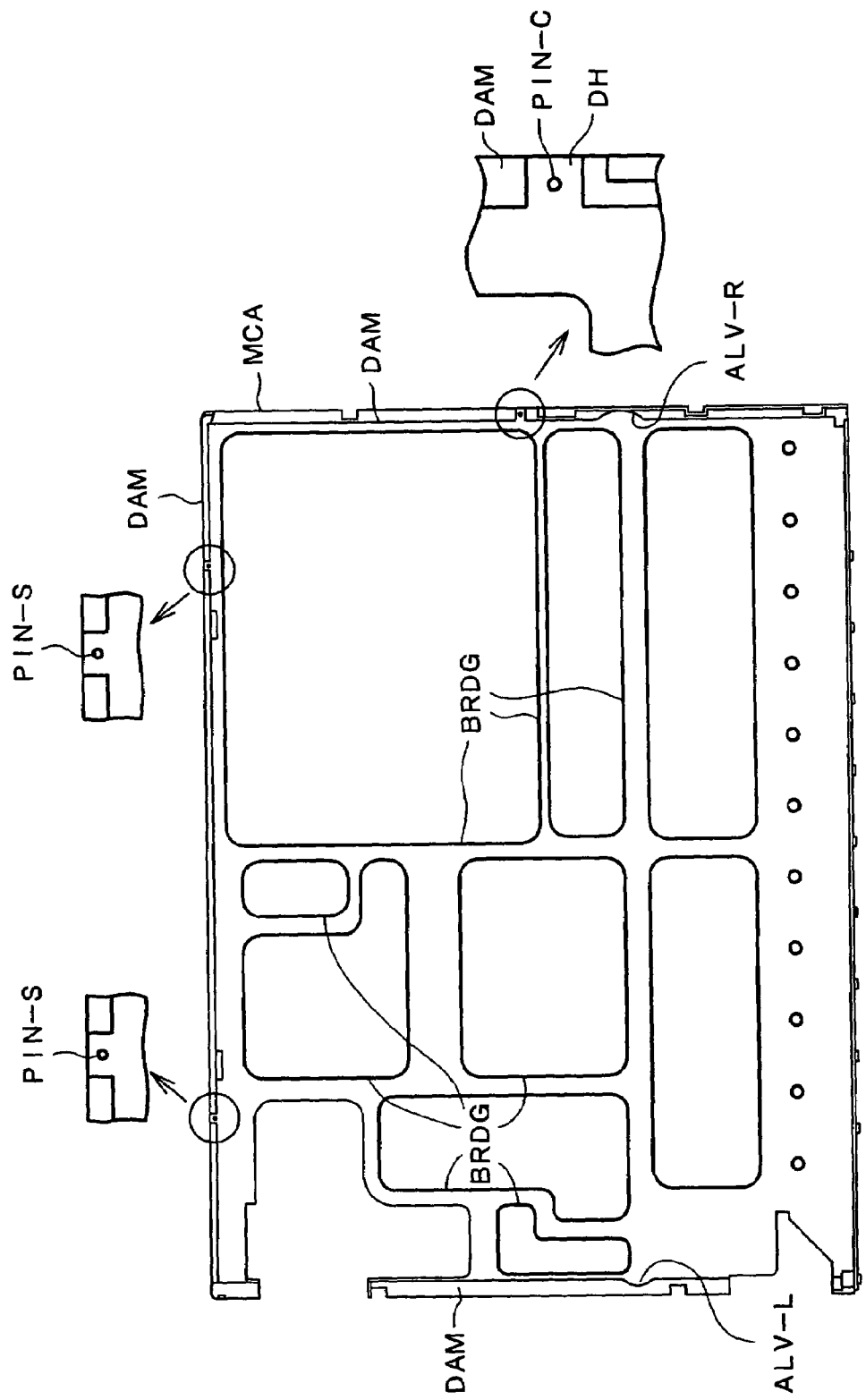
FIG. 3 is a plan view of a lower frame used in the first embodiment of the liquid crystal display device according to the present invention.

FIG. 3 is a plan view of a lower frame used in the first embodiment of the liquid crystal display device according to the present invention. The drawing shows a plan view as seen from the liquid crystal panel side. The lower frame MCA of this embodiment has an approximately rectangular shape with a bank portion DAM which has a height at an upper frame side formed on the periphery thereof. A linear lamp (cold cathode fluorescent tube) which constitutes a backlight is arranged at the lower side of FIG. 3, while a gate driver side and a drain driver side are arranged at the left side and the lower side of FIG. 3, respectively.

Respective sides of the lower frame MCA are connected to each other by a plurality of crosspieces BRDG which are arranged so as to take the mechanical strength and the heat radiation into account. Engaging recessed portions ALV-R, ALV-L of the lower frame MCA, which are formed in the bank portion DAM at left and right sides which intersect the lower side on which the linear lamp is arranged, are provided for engagement with the light guide plate (not shown in the drawing) and receive engaging projections SSTP formed on the corresponding sides of the light guide plate.

A liquid crystal filling and sealing opening of the liquid crystal panel is positioned at the right side of the lower frame MCA and the recessed portion DH, which has been described with reference to FIG. 1 and FIG. 2, is formed in the bank DAM so as to avoid a portion where the liquid crystal filling and sealing opening is formed. The columnar member PIN-C is provided in the recessed portion DH.

Figure 9:
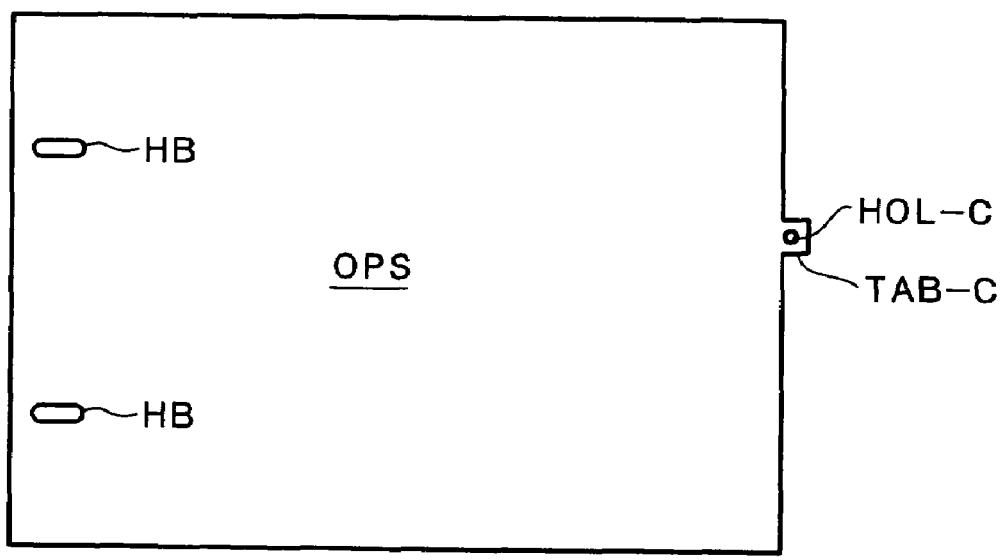
FIG. 9 is a plan view of a fourth constitutional example of an optical sheet holding structure which loosely holds an optical sheet formed on the other side from a side to which the positioning function of the optical sheet in the first embodiment of the liquid crystal display device according to the present invention is given.
Figure 10:
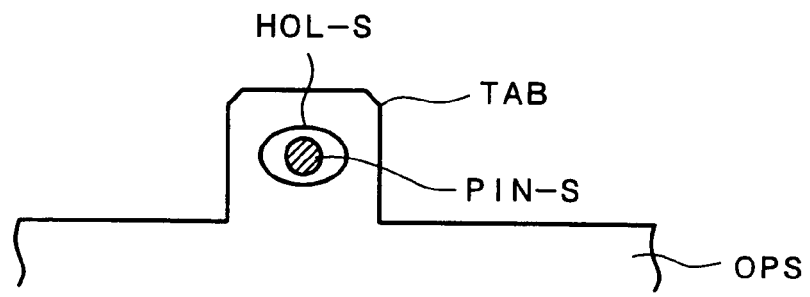
FIG. 10 is a plan view of a part of the first constitutional example of the optical sheet holding structure formed on the side close to the fixing side as shown in FIG. 6.

In this embodiment, an optical sheet holding structure which loosely holds the corresponding side of the optical sheet OPS, and which will be explained later in conjunction with FIG. 9 and FIG. 10, is provided on an upper side (a neighboring periphery of the periphery which has the recessed portion DH) of the lower frame MCA. The columnar member PIN-S is also formed in the optical sheet holding structure provided, at this upper side. The positional displacement of the optical sheet OPS with respect to the lower frame MCA, having a rectangular bottom surface as shown in FIG. 3 (the rectangular bottom surface includes a space appearing partially at an outline thereof), is prevented by two sides thereof (upper and right sides thereof as shown in FIG. 3) extended in the L-shape from one corner thereof (an upper-right corner as shown in FIG. 3).

Figure 4:
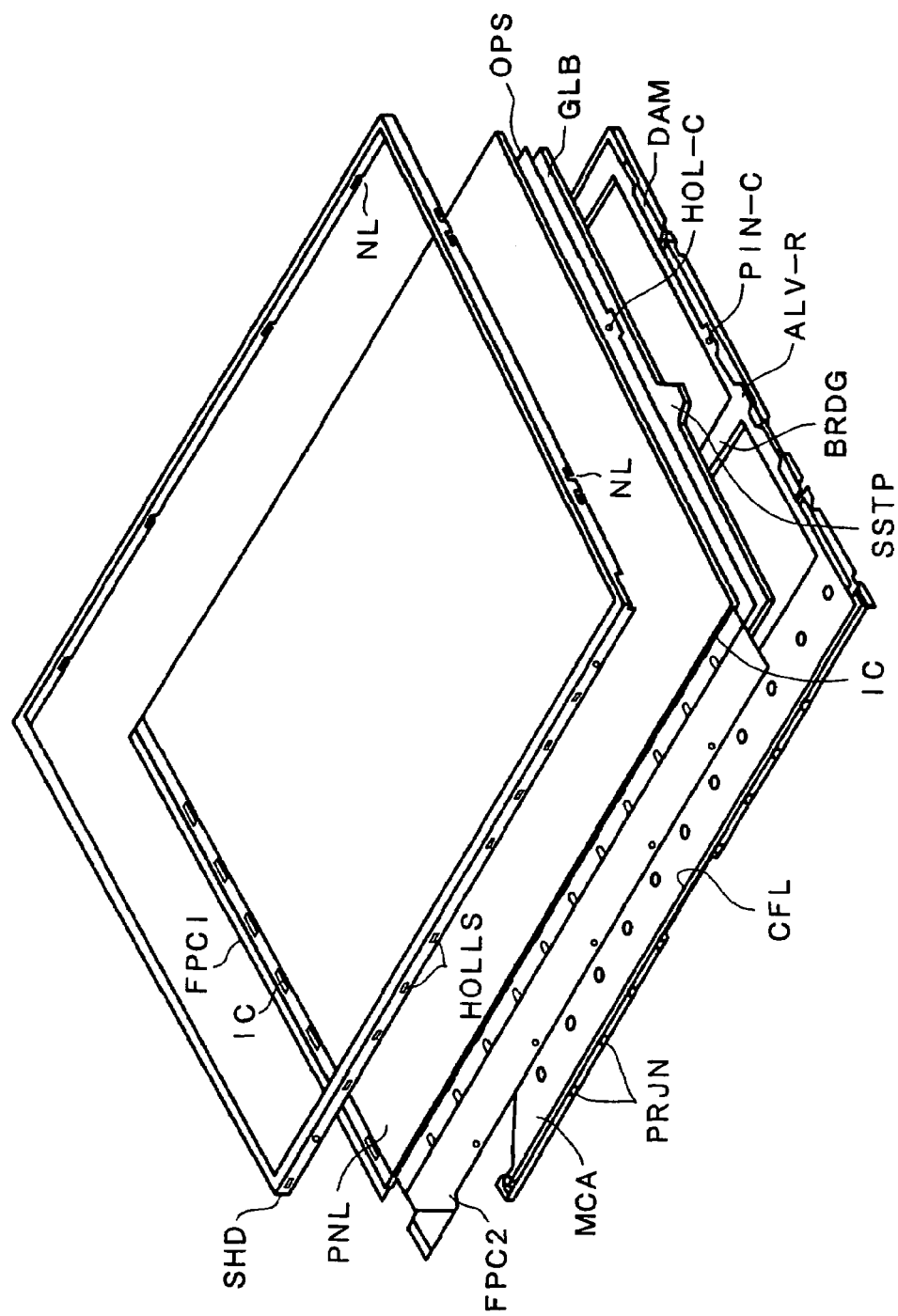
FIG. 4 is a developed perspective view illustrating the overall constitution of the first embodiment of the liquid crystal display device according to the present invention in which a light guide plate, an optical sheet and a liquid crystal panel are mounted on the lower frame shown in FIG. 3, and these members are covered with an upper frame.
Figure 5:
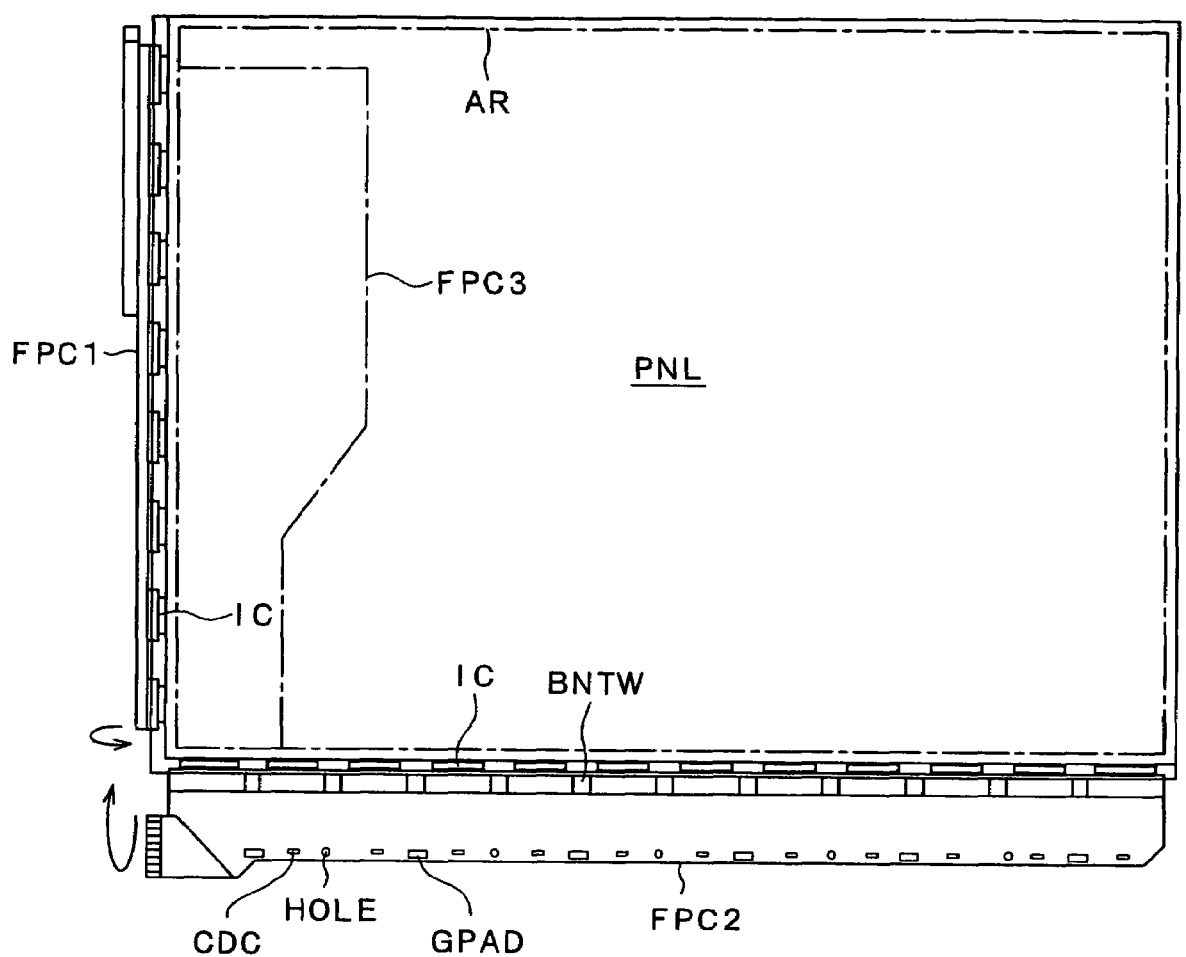
FIG. 5 is a plan view illustrating a structural example of a liquid crystal panel of the liquid crystal display device shown in FIG. 4.

FIG. 4 is a developed perspective view showing the overall constitution of the first embodiment of the liquid crystal display device according to the present invention. As shown in the drawing, a light guide plate, an optical sheet and a liquid crystal panel are mounted on the lower frame shown in FIG. 3, and these members are covered with an upper frame. FIG. 5 is a plan view showing only the liquid crystal panel of the device shown in FIG. 4.

As shown in FIG. 4, the light guide plate GLB, the optical sheet OPS and the liquid crystal panel PNL are assembled to the lower frame MCA; the upper frame SHD made of metal is mounted on the liquid crystal panel PNL; and these members have the peripheries thereof fixed to and integrally formed with the lower fame MCA, thus completing the liquid crystal display device (liquid crystal display module).

That is, by connecting projections PRJN, which are formed on the lower frame MCA, to fixing holes HOLLS formed in the periphery of the upper frame SHD, or by bending paws NL, which are formed on the upper frame SHD, over a back surface of the lower frame MCA, the upper frame SHD and the lower frame MCA are fixed to each other. In FIG. 5, a region inside of a main surface of the liquid crystal panel PNL, which is indicated by a chained line AR, represents an effective display region of the liquid crystal panel.

Engaging projections SSTP are formed on two sides of the light guide plate GLB and are engaged with the engaging recessed portions ALV-R, ALV-L (see FIG. 3 with respect to ALV-L) formed in the lower frame MCA, so that the light guide plate GLB is housed in the lower frame MCA, while being restricted to a given position.

As shown in FIG. 5, a gate driver IC and a drain driver IC are respectively directly mounted on two neighboring peripheral sides of the liquid crystal panel PNL (referred to as "FCA system" or "COG" system), and these driver ICs are respectively connected to an interface circuit board FPC3 through flexible printed circuit boards FPC1, FPC2. With respect to the flexible printed circuit FPC2, GPAD indicates a ground pad, CDC indicates an electronic part, such as a capacitor, chip or the like, and HOLE indicates a position restricting hole.

The flexible printed circuit board FPC2 is folded back to the back surface of the liquid crystal panel PNL, as indicated by an arrow at a portion of a bent window BNTW, and is connected to the interface circuit board FPC3, which is positioned at a back surface of the lower frame MCA which, in turn, is positioned at a back surface of a laminated body formed of the liquid crystal panel and the light guide body. Here, although the flexible printed circuit board FPC1 of the gate driver is also bent in the same manner, the flexible printed circuit board FPC1 is fixed to the back surface of the lower-side substrate of the liquid crystal panel PNL.

FIG. 6 to FIG. 9 relate to the optical sheet OPS in the first embodiment of the liquid crystal display device according to the present invention. These drawings are plan views which illustrate various constitutional examples of optical sheet holding structures which loosely hold the optical sheet OPS and are formed on sides other than the side of the lower frame MCA to which the positioning function is given (the side in which the projecting portion TAB-C having a through hole HOL-C is formed).

The above-mentioned positioning function is given to the right side (in the drawing) of the optical sheet OPS, and the optical sheet OPS is fixed to the lower frame after using this positioning function. However, when the optical sheet OPS is fixed in the same manner at other sides, a deformation, such as wrinkles or the like, may be generated due to a change in the environment. Accordingly, the holding of the optical sheet OPS at sides other than the side to which the above-mentioned positioning function is given (also referred to as "a fixing side" for convenience sake) is required to be loose.

Figure 6:
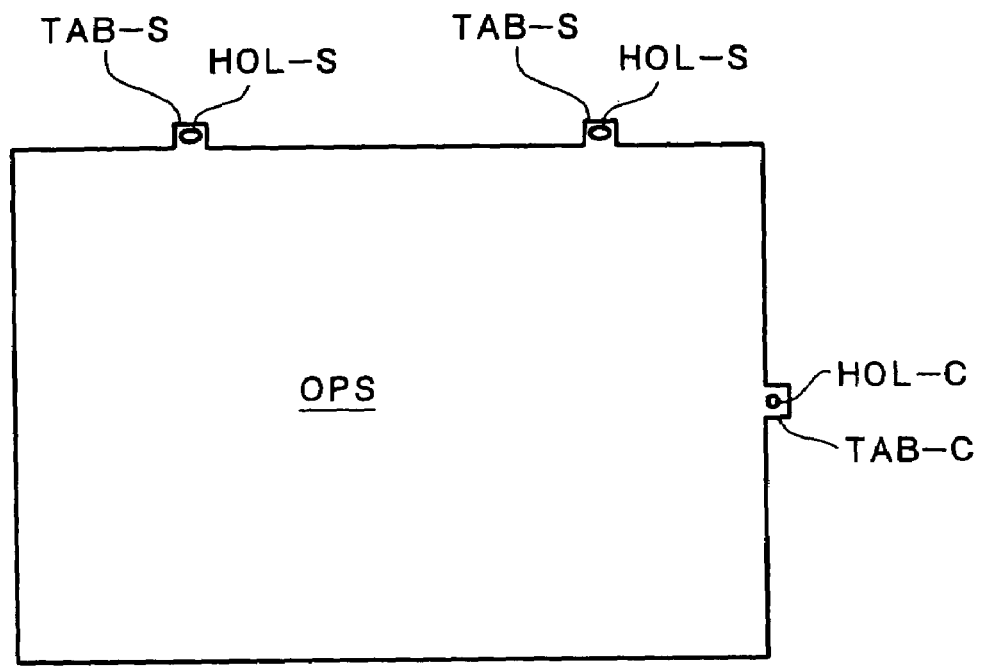
FIG. 6 is a plan view of a first constitutional example of an optical sheet holding structure which loosely holds an optical sheet formed on the other side from a side to which the positioning function of the optical sheet in the first embodiment of the liquid crystal display device according to the present invention is given.

In the constitution shown in FIG. 6, projecting portions TAB-S are formed on the side (the upper side) adjacent to the above-mentioned fixing side and through holes HOL-S, which are large enough to allow the columnar members PIN-S shown in FIG. 3 to loosely pass therethrough, are formed on the projecting portions TAB-S. Due to such a constitution, the movement of the optical sheet OPS is not obstructed in the above-mentioned neighboring side; and, hence, the deformation of the optical sheet OPS, which may be brought about by environmental changes, can be obviated.

With respect to the optical sheet OPS shown in FIG. 7, projecting portions TAB-R are formed on the side which is arranged opposite to the fixing side and the optical sheet OPS is loosely held by a holding mechanism which will be explained later in conjunction with FIG. 12.

Figure 8:
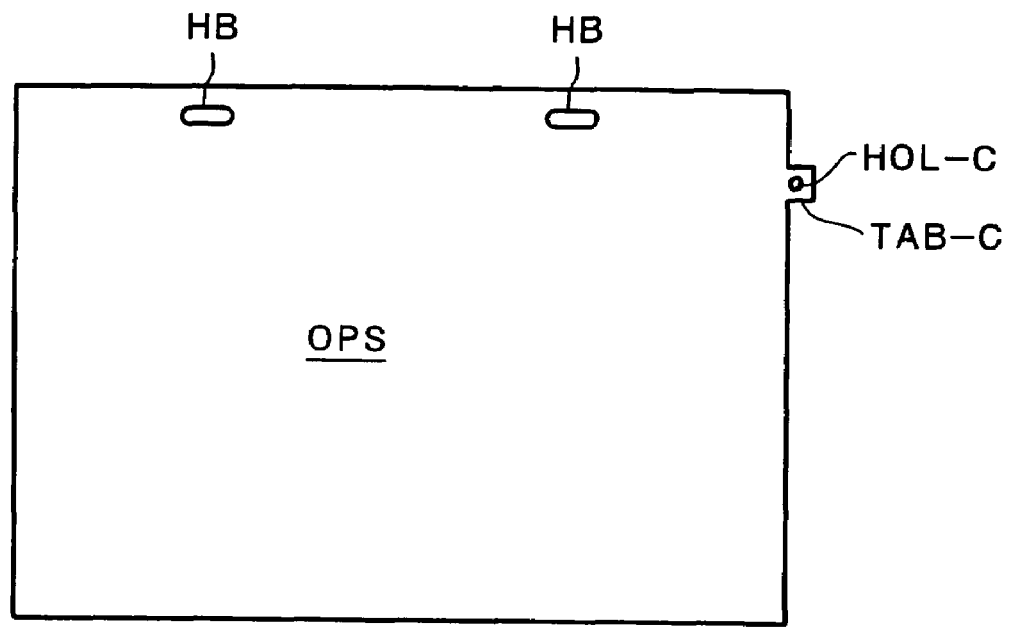
FIG. 8 is a plan view of a third constitutional example of an optical sheet holding structure which loosely holds an optical sheet formed on the other side from a side to which the positioning function of the optical sheet in the first embodiment of the liquid crystal display device according to the present invention is given.

With respect to the optical sheet OPS shown in FIG. 8, through holes HB, which are similar to the through holes HOL-S formed in the projecting portions TAB-S shown in FIG. 6, are formed on the side adjacent to the fixing side, and the optical sheet OPS is held by allowing columnar members similar to those shown in FIG. 6 to loosely pass through these through holes HB.

In FIG. 9, through holes HB, which are similar to the through holes HB shown in FIG. 8, are formed in the side which is arranged opposite to the fixing side of the optical sheet OPS, and the optical sheet OPS is held by allowing columnar members similar to those shown in FIG. 6 to loosely pass through these through holes HB.

Figure 11:
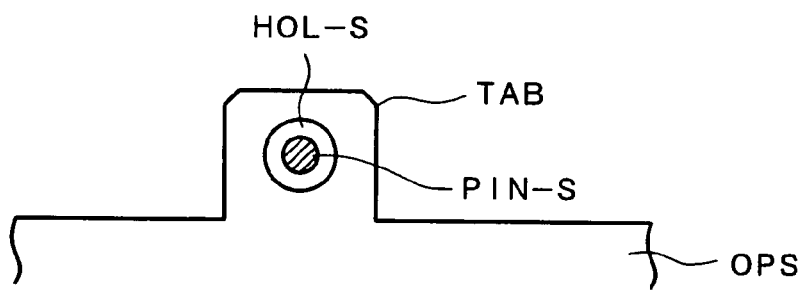
FIG. 11 is a plan view of a part of the second constitutional example of the optical sheet holding structure formed on the side close to the fixing side as shown in FIG. 6.

FIG. 10 and FIG. 11 are plan views of part of the optical sheet OPS. These drawings show the state in which, as described in conjunction with FIG. 6, the projecting portion TAB-S is formed on the side (upper side) adjacent to the fixing side and the through hole HOL-S, which is large enough to allow the columnar member PIN-S shown in FIG. 3 to loosely pass therethrough, is formed in the projecting portion TAB-S.

With respect to the through holes HOL-S formed in the optical sheet OPS, as seen in FIG. 10, the holes HOL-S are formed to have an elliptical shape, which has the long axis thereof extending in the direction parallel to the side, and a columnar member PIN-S having a diameter smaller than the short-axis diameter of the through hole HOL-S is mounted on the lower frame MCA side.

Further, as seen in FIG. 11, a through hole HOL-S in the optical sheet OPS is formed to have a circular shape, and a columnar member PIN-S having a diameter smaller than a diameter of the circular shape is mounted on the lower frame MCA side.

The shape of through holes HOL-S, which are formed in the optical sheet OPS in FIG. 10 and FIG. 11, and the shape of the columnar members PIN-S, which are formed on the lower frame side and pass through the through holes HOL-S, may be shapes other than the above-mentioned shapes. For example, the through hole HOL-S may be formed in an oblong shape, a polygonal shape, a slit-shape or the like, for example, while the shape of the columnar member PIN-S may have an elliptical cross section, an oblong cross section, a polygonal cross section, a semi-elliptical cross section, or other shape.

Figure 7:
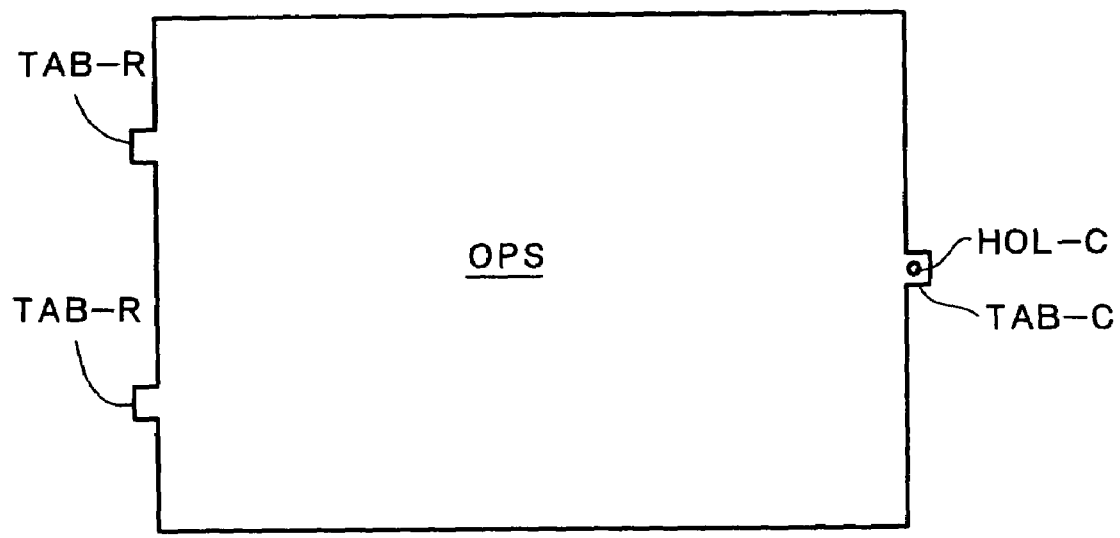
FIG. 7 is a plan view of a second constitutional example of an optical sheet holding structure which loosely holds an optical sheet formed on the other side from a side to which the positioning function of the optical sheet in the first embodiment of the liquid crystal display device according to the present invention is given.
Figure 12:
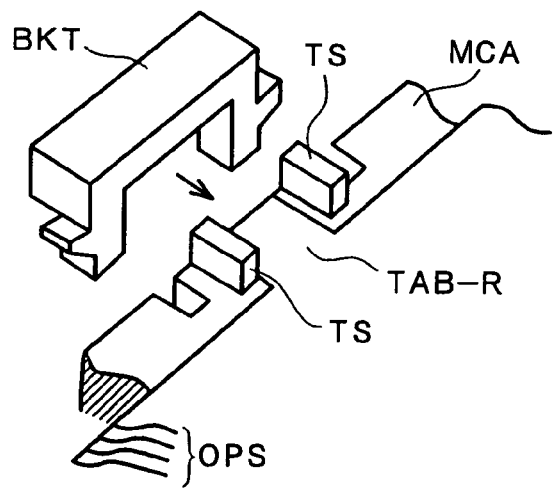
FIG. 12 is a perspective view of an example of an optical sheet holding structure at a side close to the fixing side as shown in FIG. 6 or at a side which faces the fixing side as shown in FIG. 7 in an opposed manner.

FIG. 12 is a perspective view illustrating a structural example for loosely holding an optical sheet at a side adjacent to the fixing side, as shown in FIG. 6, or at a side which is arranged opposite to the fixing side, as shown in FIG. 7.

Although the structure in which the optical sheet is loosely held at the side arranged opposite to the fixing side is explained as an example here, a structure which loosely holds the optical sheet at the side adjacent to the fixing side will perform the same function.

At one portion or two or more portions on the side which is arranged opposite to the fixing side of the optical sheet OPS, projecting portions TAB-R similar to those described in conjunction with FIG. 7 are provided. On the other hand, a pair of projecting walls TS are formed at the lower frame MCA side while forming a gap therebetween which is slightly larger than the width of the projecting portion TAB-R in the direction parallel to the side of the lower frame MCA.

The projecting portion TAB-R of the optical sheet OPS is inserted between a pair of walls TS and a press member BKT is fitted on the projecting portion TAB-R in the direction of an arrow so as to constrain the projecting portion TAB-R from above. The projecting portion TAB-R is loosely held in a space defined between a pair of walls TS and the press member BKT.

According to the above-mentioned embodiment, the accurate positioning and the holding of the optical sheet OPS, in such a way as to prevent the removal and the disengagement of the optical sheet OPS from the lower frame MCA, are performed at one side, and, at the same time, it becomes possible to obviate the deformation of the optical sheet OPS which may be caused by environmental changes or the like.

Figure 13:
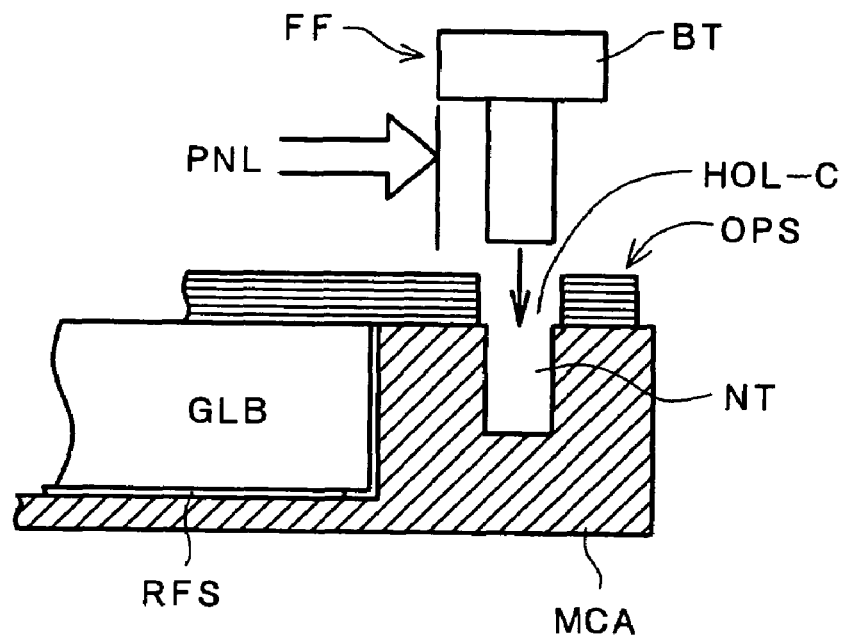
FIG. 13 is a cross-sectional view of a liquid crystal display device after constitutional members are assembled in the second embodiment of the liquid crystal display device according to the present invention.

FIG. 13 is a cross-sectional view of the liquid crystal display device after constitutional members are assembled to illustrate the second embodiment of the liquid crystal display device according to the present invention. In this embodiment, in place of the columnar member PIN-C of the lower frame MCA described in conjunction with FIG. 2, a hole NT is formed in the lower frame MCA, an insertion member BT having a pin shape with a head is allowed to pass through a through hole HOL-C formed in the optical sheet OPS and is fitted into the hole NT under pressure so as to position and hold the optical sheet OPS. Although this embodiment is similar to the first embodiment, as described in conjunction with FIG. 1, with respect to the holding of other sides of the optical sheet OPS and the other constitutions, the columnar member may be replaced with an insertion member having a pin shape with a head which is similar to the above-mentioned insertion member BT having the pin shape with the head which is loosely engaged with a through hole formed in the optical sheet.

In this embodiment, a side wall FF of the head of the insertion member BT at the liquid crystal panel PNL side can be used as a positioning guide for the liquid crystal panel. Accordingly, even when there exists some difference in size with respect to the liquid crystal panel, the insertion member BT can be made to function as a desired positioning guide by changing the size of the head of the insertion member BT.

Further, in this embodiment, by adopting a method in which the insertion member BT is passed through the through hole HOL-C formed in the optical sheet OPS, which is integrally formed by preliminarily laminating a plurality of sheets, and then the insertion member BT is further pushed into the hole NT of the lower frame MCA, it becomes possible to obtain an advantage that the assembling operation can be simplified.

Also according to this embodiment, the accurate positioning and the holding of the optical sheet OPS, in such a way as to prevent the removal and the disengagement of the optical sheet OPS from the lower frame MCA, are performed at one side, and, at the same time, it becomes possible to obviate the deformation of the optical sheet OPS which may be caused by environmental changes or the like.

Figure 14:
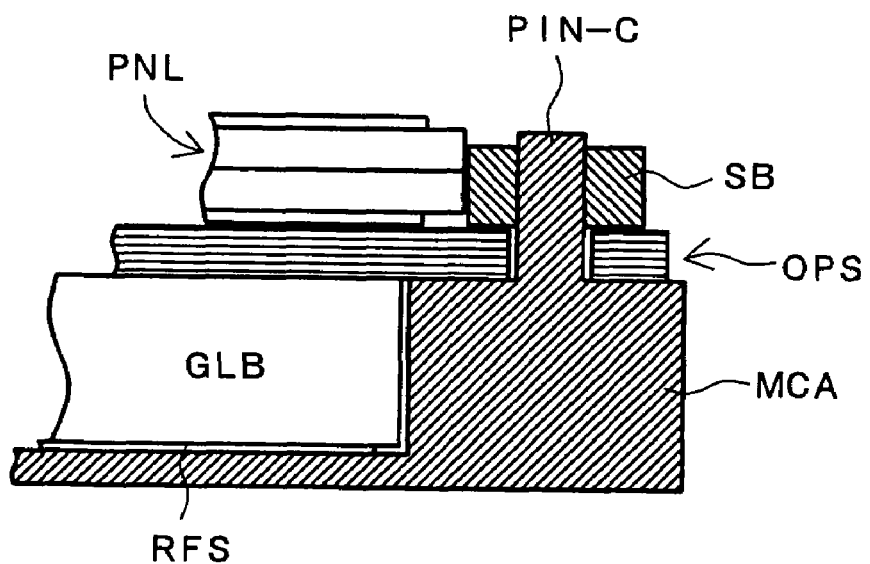
FIG. 14 is a cross-sectional view of a liquid crystal display device after constitutional members are assembled in the third embodiment of the liquid crystal display device according to the present invention.
Figure 17A:
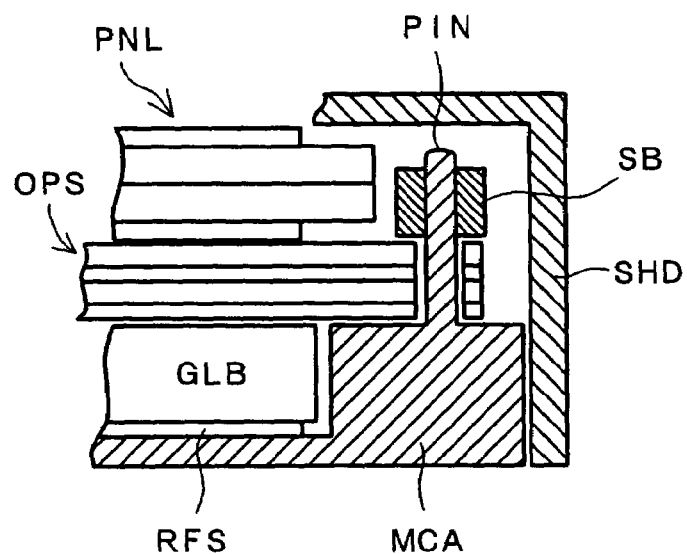
Figure 17B:
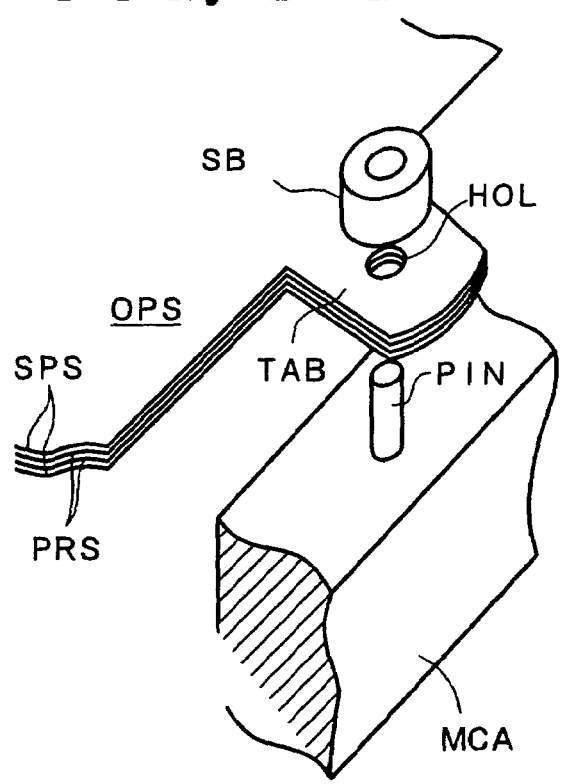
Figure 18A:
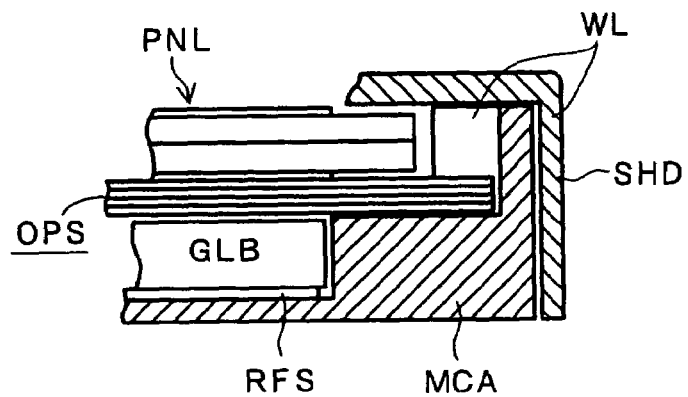
Figure 18B:
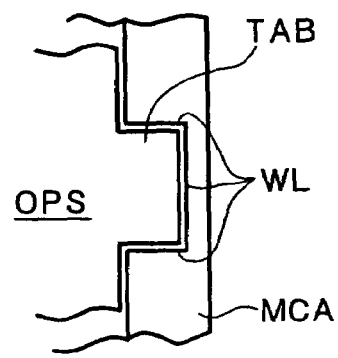
Figure 19:
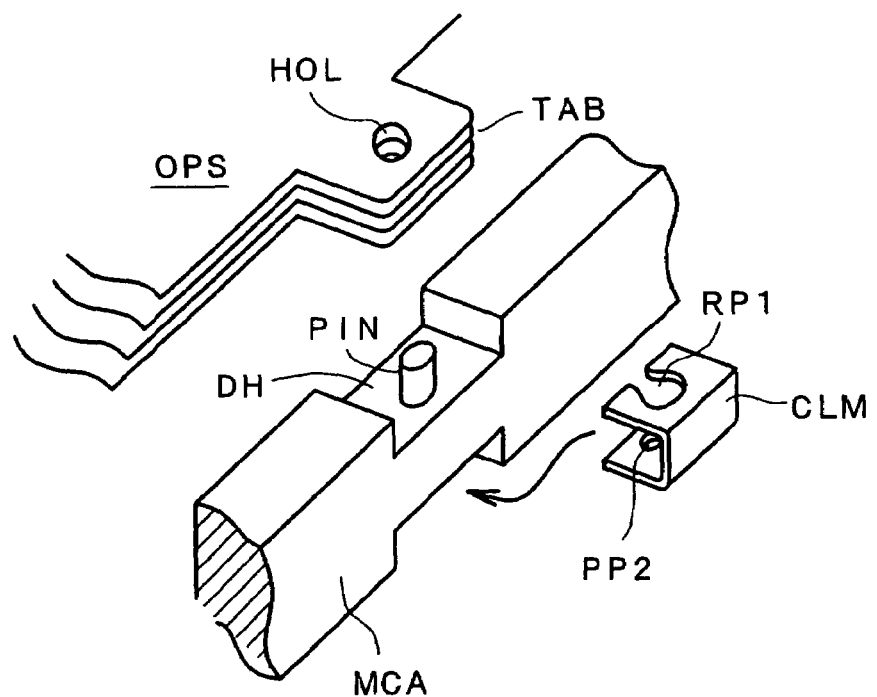
FIG. 19 is a developed perspective view of part of still another conventional example showing positioning of an optical sheet in a liquid crystal display device and a holding structure thereof.

FIG. 14 is a cross-sectional view of a liquid crystal display device after constitutional members are assembled to illustrate the third embodiment of the liquid crystal display device according to the present invention. In this embodiment, a cylindrical sleeve SB, similar to the above-mentioned cylindrical sleeve SB, which was described in conjunction with FIG. 17A and FIG. 17B, is fitted on the columnar member PIN-C of the lower frame MCA, which described in conjunction with FIG. 2, thus fixing the optical sheet OPS to the columnar member PIN-C such that the optical sheet OPS is not disengaged from the columnar member PIN-C.

The cylindrical sleeve SB can be made to function as a positioning guide for the liquid crystal panel PNL by changing the diameter of the cylindrical sleeve SB. Further, by changing the size of the cylindrical sleeve SB or by adjusting the extent of protrusion a wall of a side surface thereof which faces the liquid crystal panel PNL in an opposed manner, it becomes possible to make the cylindrical sleeve SB function as a desired positioning guide. With respect to the holding of other sides of the optical sheet OPS and other constitutions, this embodiment is similar to the first embodiment, which was described in conjunction with FIG. 1, and the above-mentioned second embodiment.

Also, according to this embodiment, the accurate positioning of the optical sheet OPS on the lower frame MCA and the holding of the optical sheet OPS, in such a way as to prevent the removal and the disengagement of the optical sheet OPS from the lower frame MCA, are performed at one side of the optical sheet OPS, and, at the same time, it becomes possible to obviate the deformation of the optical sheet OPS which may be caused by environmental changes or the like.

According to the embodiments which have been described heretofore, the positioning and the holding of the optical sheet onto the lower frame can be reliably performed, and, at the same time, the positioning of the liquid crystal panel which is mounted on the optical sheet in a laminated manner can be performed in common with the above operations so that the removal or the displacement of the optical sheet at the time of conveying or transporting the lower frame, into which the optical sheet is incorporated, can be suppressed. Further, since the man-hours for assembling can be reduced, the assembling operation can be simplified and the manufacturing cost can be reduced.

Figure 15:
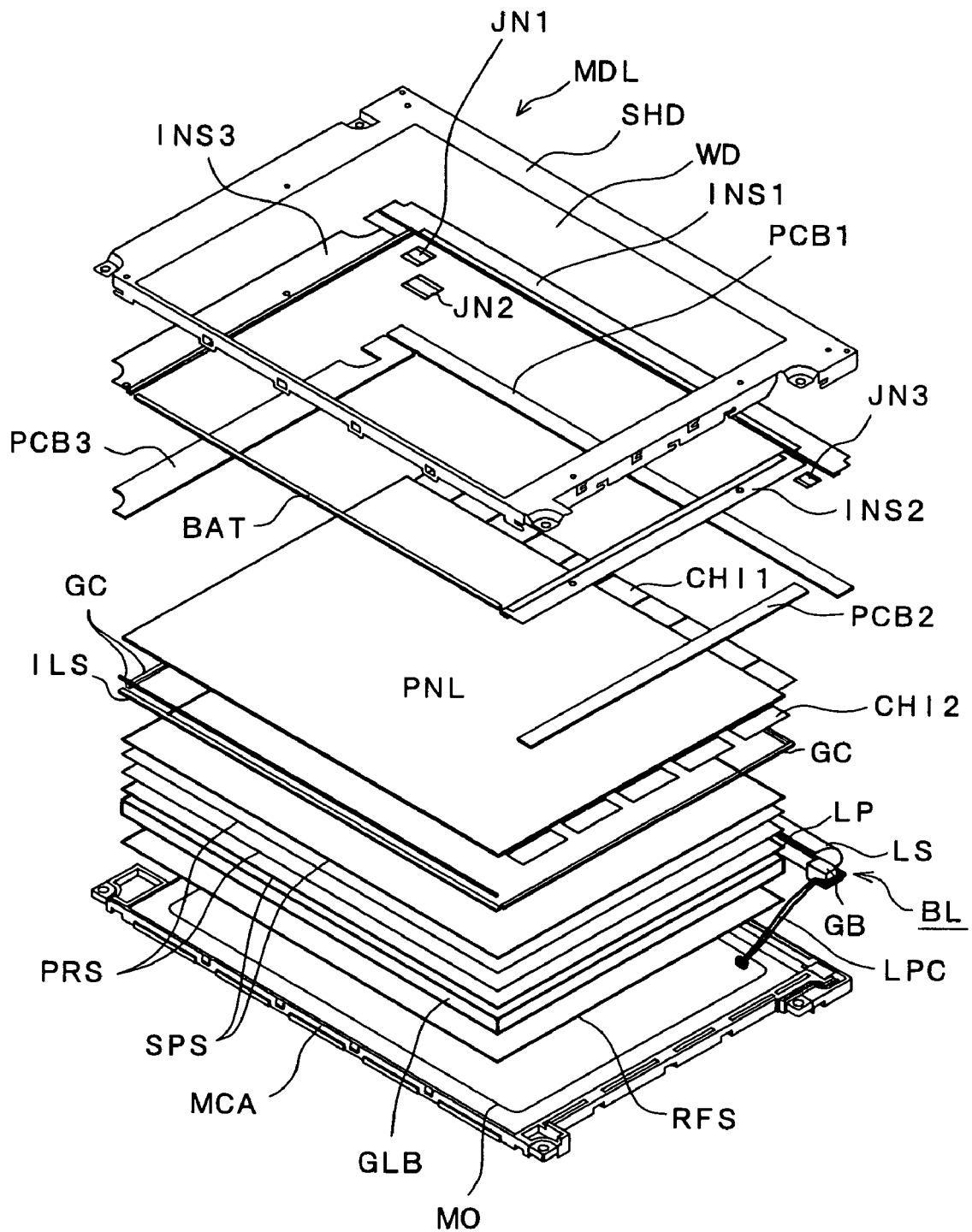
FIG. 15 is a developed perspective view showing an example of the details of the overall constitution of the liquid crystal display device according to the present invention.

FIG. 15 is a developed perspective view illustrating an example of the details of the overall constitution of the liquid crystal display device according to the present invention. In contrast to the liquid crystal display panel shown in FIG. 4 and FIG. 5, which constitutes a so-called FCA or COG construction, in the liquid crystal panel used in this liquid crystal display device (liquid crystal display module), driving circuits (a gate driver, a drain driver) are mounted on a tape carrier package TCP and are connected to input terminal wiring which is pulled out to the periphery of the liquid crystal panel.

In FIG. 15, the liquid crystal display device includes an upper frame SHD made of a metal plate (also referred to as "metal frame"), a display window WD, insulation sheets INS1 to INS3, printed circuit boards PCB1 to PCB3 (PCB1: drain-side circuit board (video signal line driving circuit board, PCB2: gate-side circuit board (scanning signal line driving circuit board, PCB3: interface circuit board), joiners JN1 to JN3 which electrically connect the circuit boards PCB1 to PCB3 to each other, tape carrier packages TCP1 and TCP2 (TCP), a liquid crystal panel PNL, a rubber cushion GC, a light shielding spacer ILS, a prism sheet PRS, a diffusion sheet SPS, a light guide plate GLB, a reflection sheet RFS, a lower frame (a mold frame formed by integral molding) MCA, an opening MO of the lower frame MCA, a fluorescent tube (also referred to as "a tubular light source" or "a linear lamp": usually a cold cathode fluorescent tube) LP, a lamp cable LPC, a rubber bushing GB which supports the fluorescent lamp LP, a double-sided adhesive tape BAT, and a backlight BL, which is constituted of the fluorescent tube LP, the light guide plate GLB, a lamp reflection sheet LS and the like. These components are laminated in accordance with the positional relationship shown in the drawing so as to assemble a liquid crystal display device (a liquid crystal display module) MDL.

The liquid crystal display module MDL has two kinds of housing/holding members (cases) consisting of the lower frame MCA and the upper frame SHD. The liquid crystal display module MDL is formed by merging the metallic upper frame SHD, which houses and fixes the insulation sheets INS1 to INS3, the printed circuit boards PCB1 to PCB3 and the liquid crystal panel PNL therein, and the lower frame MCA which houses the backlight BL consisting of the fluorescent tube LP, the light guide plate GLB, the prism sheets PRS, the light diffusion sheet SPS and the like.

A drain driver IC (an integrated circuit chip), which serves to supply video signals to respective pixels of the liquid crystal panel PNL, is mounted on the drain-side circuit board PCB1, while a gate driver IC, which serves to scan pixels, is mounted on the gate-side circuit board PCB2.

Further, on the interface circuit board PCB3, an integrated circuit chip, which receives video signals from an external host computer and receives control signals, such as timing signals and the like, a timing converter TCON, which generates clock signals by processing timing and the like, are mounted.

The clock signals which are generated by the timing converter TCON are supplied to an integrated circuit chip mounted on the video signal line driving circuit board PCB1 through clock signal lines CLL mounted on the interface circuit board PCB3 and the video signal line driving circuit board PCB1.

The interface circuit board PCB3 and the video signal line driving circuit board PCB1 are constituted of multilayered wiring boards and the clock signal lines CLL are formed as inner-layer wiring of the interface circuit board PCB3 and the video signal line driving circuit board PCB1.

The drain-side circuit board PCB1 for driving TFTs, the gate-side circuit board PCB2 and the interface circuit board PCB3 are connected to the liquid crystal panel PNL through the tape carrier packages TCP1, TCP2 and these circuit boards are connected to each other through the joiners JN1 to JN3.

Figure 16:
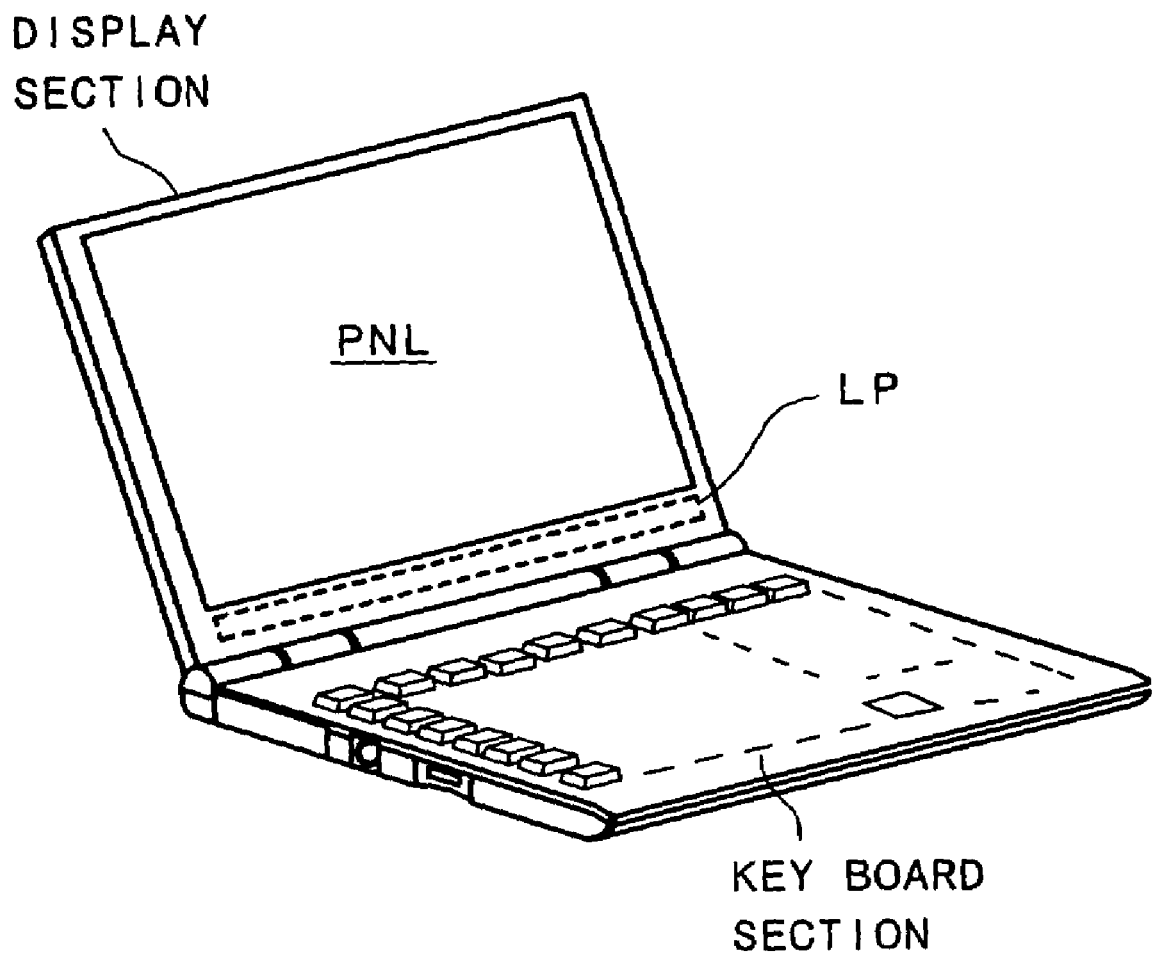
FIG. 16 is a perspective view showing one example of a notebook type personal computer on which the liquid crystal display device according to the present invention is mounted.

FIG. 16 is a perspective view showing one example of a notebook type personal computer on which the liquid crystal display device according to the present invention is mounted. The above-mentioned liquid crystal display device is mounted on a display part of this notebook type personal computer, and the linear lamp LP is mounted on a lower side of the liquid crystal display device. A body of the notebook type personal computer includes a key board part and houses a host computer (a CPU) and other information processing equipment therein.

The liquid crystal display device according to the present invention is not limited to the notebook type personal computer shown in FIG. 7 and it is needless to say that the liquid crystal display device is applicable to a display monitor, a television receiver set and a display device of other equipment in the same manner.

Further, the application of the present invention is not limited to a liquid crystal display device using the above-mentioned active matrix type liquid crystal panel. That is, the present invention is also applicable to a display device which adopts a simple matrix type liquid crystal panel or various other kinds of panel-type display devices in the same manner.

As has been described heretofore, the present invention can provide a liquid crystal display device which has a structure capable of suppressing the removal or disengagement of the optical sheet assembled to the lower frame at the time of transporting or at the time of transferring the assembly, so as to reduce man-hours for assembling and simplifying the operation and reducing the manufacturing cost by ensuring the reliable positioning and holding of the optical sheet onto the lower frame and by using the positioning guide of a liquid crystal panel and positioning means of the optical sheet in common.

While we have shown and described several embodiments in accordance with the present invention, it is understood that the same is not limited thereto, but is susceptible of numerous changes and modifications as known to those skilled in the art, and we therefore do not wish to be limited to the details shown and described herein, but intend to cover all such changes and modifications as are encompassed by the scope of the appended claims.

What is claimed is:

1. A display device comprising:
   a liquid crystal panel;
   at least one optical sheet which comprises a light diffusion sheet and a prism sheet; and
   a case formed by resin molding,
   wherein the at least optical sheet is disposed between the liquid crystal panel and the case, and the liquid crystal panel comprises a first edge extending along a first direction and a second edge extending along a second direction which is transverse to the first direction,
   wherein the at least one optical sheet comprises a first side extended along the first direction comprising a first projection portion protruding from the first side and a second side comprising a second projection portion protruding from the second side, the first projection portion has a first opening and the second projection portion comprises a second opening;
   wherein the case comprises a first columnar member passing through the first opening of the at least one optical sheet and a second columnar member passing through the second opening of the at least one optical sheet, the first columnar member and the second columnar member are formed integrally with the case, and the columnar member serves as a guide for positioning the liquid crystal panel;
   wherein a length of the first edge of the liquid crystal panel is shorter than a length of the second edge of the crystal panel, and a length of the second opening extending in a first direction is shorter than a length of the second opening extending in a second direction; and
   wherein the display device further comprises at least one linear lamp extending along the second direction, and the second side extends in the second direction.

2. A display device according to claim 1, wherein the mold case has a recessed portion, and the first columnar member is provided in the recessed portion.

3. A display device according to claim 1, wherein the columnar member serves as a guide for positioning the liquid crystal panel.

4. A display device according to claim 1, wherein the at least one optical sheet comprises a third projection portion protruding from the second side.

5. A display device comprising:
   a liquid crystal panel;
   at least one optical sheet;
   a mold case; and
   a case formed by resin molding,
   wherein the at least optical sheet is disposed between the liquid crystal panel and the case, and the liquid crystal panel comprises a first edge extending along a first direction and a second edge extending along a second direction which is transverse to the first direction, and a length of the first edge of the liquid crystal panel shorter than a length of the second edge of the liquid crystal panel,
   wherein the at least one optical sheet comprises a first side extended along the first direction comprising a first projection portion protruding from the first side and a second side extended along the first direction comprising a second projection portion protruding from the second side, and the first projection portion comprises a first opening,
   wherein the case comprises a columnar member passing through the first opening of the at least one optical which serves as a guide for positioning the liquid crystal panel, and a first structure loosely holding the second projection portion protruding from the second side of the at least one optical sheet,
   wherein the display device further comprises at least one linear lamp extending along the second direction, and
   wherein the at least one optical sheet comprises a third projection portion protruding from the second side, and the case comprises a second structure loosely holding the third projection portion protruding from the second side of the at least one optical sheet.

6. A display device according to claim 5, wherein the at least one optical sheet comprises a light diffusion sheet and a prism sheet.

7. A display device according to claim 5, wherein the mold case has a recessed portion, and the first columnar member is provided in the recessed portion.

8. A display device according to claim 7, wherein the columnar member serves as a guide for positioning the liquid crystal panel.

9. A display device according to claim 7, wherein the at least one optical sheet comprises a light diffusion sheet and a prism sheet.

10. A display device according to claim 9, wherein the columnar member serves as a guide for positioning the liquid crystal panel.

* * * * *